United States Patent
Brodie et al.

(10) Patent No.: US 11,709,347 B2
(45) Date of Patent: Jul. 25, 2023

(54) FOLDED CAMERA WITH AUTOFOCUS AND OPTICAL IMAGE STABILIZATION SYSTEMS

(71) Applicant: Apple Inc., Cupertino, CA (US)

(72) Inventors: Douglas S. Brodie, Los Gatos, CA (US); Scott W. Miller, Los Gatos, CA (US); Nicholas D. Smyth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/480,048

(22) Filed: Sep. 20, 2021

(65) Prior Publication Data

US 2022/0091397 A1 Mar. 24, 2022

Related U.S. Application Data

(60) Provisional application No. 63/083,004, filed on Sep. 24, 2020.

(51) Int. Cl.
*G02B 13/00* (2006.01)
*G02B 7/09* (2021.01)
(Continued)

(52) U.S. Cl.
CPC .......... *G02B 13/0065* (2013.01); *G02B 5/00* (2013.01); *G02B 7/09* (2013.01); *G03B 13/36* (2013.01);
(Continued)

(58) Field of Classification Search
CPC ........ G02B 13/0065; G02B 5/00; G02B 7/09; G02B 7/08; G02B 27/646; G03B 13/36;
(Continued)

(56) References Cited

U.S. PATENT DOCUMENTS

| 8,446,475 B2 | 5/2013 | Topliss et al. |
| 9,383,550 B2 | 7/2016 | Osborne |

(Continued)

FOREIGN PATENT DOCUMENTS

| KR | 20210125323 A | * | 10/2021 | |
| WO | WO-2020134416 A1 | * | 7/2020 | ......... G02B 13/0065 |

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

A folded camera may include folded optics arrangement positioned optically in front of an image sensor. The folded optics arrangement may include one or more light-folding elements and a lens group having one or more lens elements. Light may pass through the folded optics arrangement, within which the light be folded or redirected by the light-folding element, to focus on an image plane on the image sensor. The folded camera may include a shape-memory actuator having one or more shape-memory elements, whose lengths and/or shapes may be controlled by regulating individual temperatures of the shape-memory elements. The shape-memory actuator may move the lens group relative to the image sensor to implement various autofocus (AF) functions. The folded camera may include a voice coil motor (VCM) which may be controlled to move the image sensor relative to the lens group to perform various optical image stabilization (OIS) functions.

20 Claims, 8 Drawing Sheets

(51) Int. Cl.
  *G03B 13/36* (2021.01)
  *G02B 5/00* (2006.01)
  *H04N 23/68* (2023.01)

(52) U.S. Cl.
  CPC ... *H04N 23/687* (2023.01); *G03B 2205/0007* (2013.01)

(58) Field of Classification Search
  CPC .... G03B 2205/0007; G03B 2205/0069; G03B 2205/0076; G03B 3/10; G03B 5/00; G03B 17/17; G03B 30/00; H04N 5/23287; H04N 5/2254; H04N 5/2253
  See application file for complete search history.

(56) References Cited

U.S. PATENT DOCUMENTS

| | | | |
|---|---|---|---|
| 2015/0153630 A1* | 6/2015 | Chen | G03B 13/36 |
| | | | 348/357 |
| 2016/0227088 A1* | 8/2016 | Brown | H04N 5/2254 |
| 2018/0171991 A1* | 6/2018 | Miller | F16M 11/048 |
| 2019/0020822 A1* | 1/2019 | Sharma | H04N 5/2253 |
| 2020/0073140 A1 | 3/2020 | Eddington et al. | |
| 2020/0400464 A1 | 12/2020 | Yedid et al. | |
| 2021/0266465 A1* | 8/2021 | Wang | H04N 5/23258 |
| 2021/0318509 A1* | 10/2021 | Jun | G03B 17/17 |

* cited by examiner

US 11,709,347 B2

FOLDED CAMERA WITH AUTOFOCUS AND OPTICAL IMAGE STABILIZATION SYSTEMS

This application claims benefit of priority to U.S. Provisional Application Ser. No. 63/083,004, entitled "Folded Camera with Autofocus and Optical Image Stabilization Systems," filed Sep. 24, 2020, and which is hereby incorporated herein by reference in its entirety.

BACKGROUND

Technical Field

This disclosure relates generally to a folded camera and more specifically to autofocus (AF) and optical image stabilization (OIS) systems of a folded camera.

Description of the Related Art

The advent of mobile multipurpose devices such as smartphones, tablet or pad devices has resulted in a need for bigger lenses such as ultra- or super-wide lenses for integration in cameras of the devices. Some cameras may incorporate optical image stabilization (OIS) systems that may sense and react to external excitation/disturbance by adjusting location of the optical lens in an attempt to compensate for unwanted motion of the lens. Furthermore, some cameras may incorporate an autofocus (AF) systems whereby the object focal distance can be adjusted to focus an object plane in front of the camera at an image plane to be captured by the image sensor. In some such AF mechanisms, the optical lens is moved as a single rigid body along the optical axis of the camera to refocus the camera.

Figure 1:
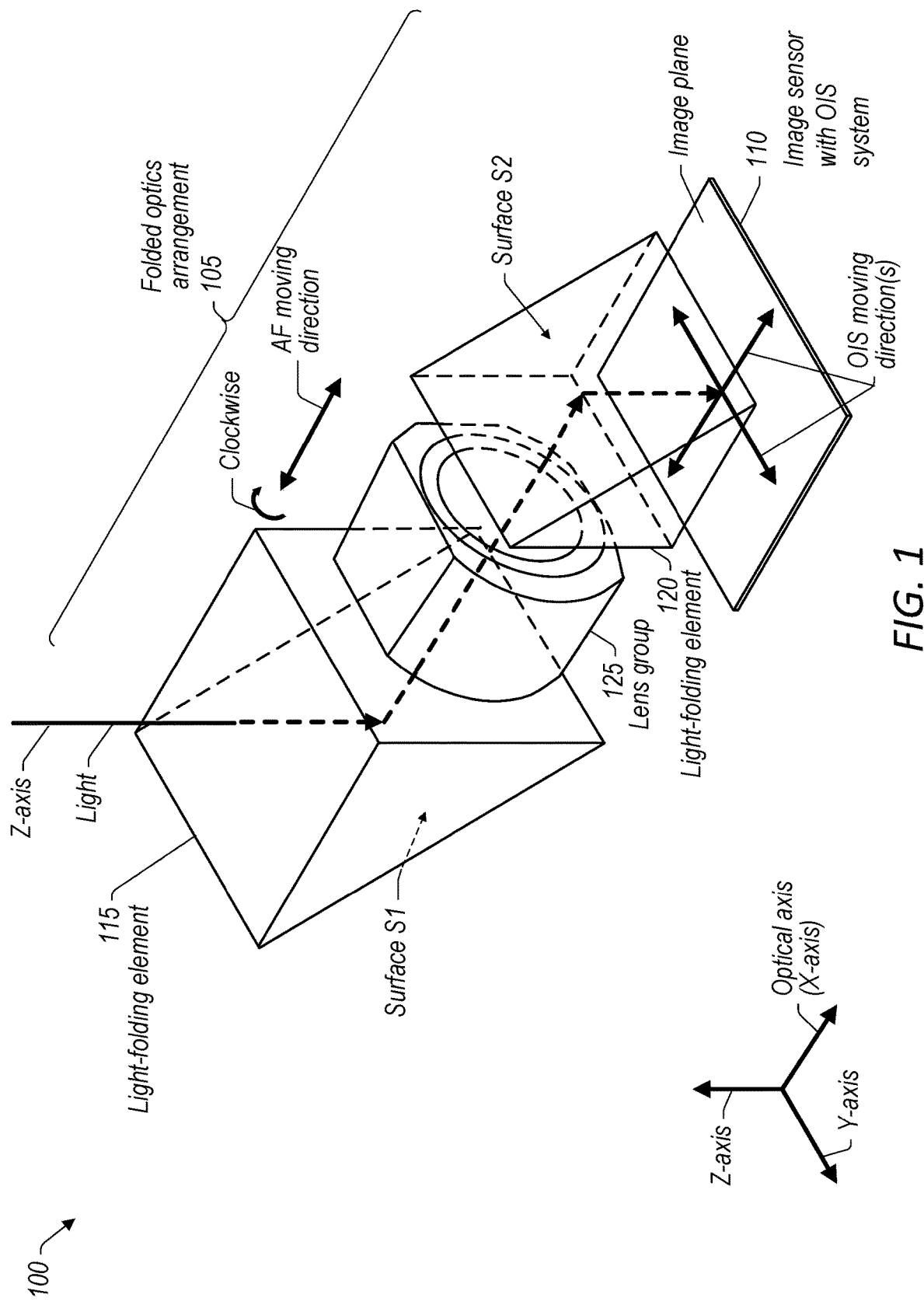
FIG. 1 shows an example camera with AF and OIS functions, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a folded camera having autofocus (AF) and/or optical image stabilization (OIS) functions. In some embodiments, the camera may include a folded optics arrangement, an image sensor, an AF system, and an OIS system. In some embodiments, the folded optics arrangement may be positioned optically in front of the image sensor, on the optical transmitting path of light, such that the light may pass through the folded optics arrangement and then focus on an image plane on the image sensor. In some embodiments, the folded optics arrangement may include one or more light-folding elements (e.g., one or more prisms and/or reflective mirrors) and a lens group having one or more lens elements. In some embodiments, the light may be folded, e.g., be reflected, by the one or more light-folding elements such that the optical transmitting path of the light may be redirected from one direction to another. In some embodiments, the camera including the AF and/or OIS systems disclosed herein may be integrated as part of mobile multipurpose devices such as smartphones, tablet, or pad devices.

In some embodiments, the AF system may be controlled to move the lens group relative to the image sensor, e.g., in at least one direction approximately parallel to an optical axis of the lens group. In some embodiments, the AF system may include a shape-memory actuator having one or more shape-memory elements whose lengths and/or shapes may be controlled under a temperature-induced shape-memory effect by regulating the individual temperatures of those shape-memory elements. In some embodiments, the shape-memory actuator may include a moveable stage and a stationary base. In some embodiments, the moveable stage may be fixedly coupled with the lens group, whilst the stationary base may be indirectly, fixedly coupled with the image sensor. In some embodiments, the moveable stage (together with the lens group) may be flexibly coupled with the stationary base (together with the image sensor) via at least the one or more shape-memory elements of the shape-memory actuator. For instance, the shape-memory elements may include one or more shape-memory wires, where for individual wires, a respective first portion is attached to the stationary base whilst a respective second portion is attached to the moveable stage. Therefore, in some embodiments, when the shape-memory elements change their lengths and/or shapes under the temperature-induced shape-memory effect, the moveable stage (together with the lens group) may be pushed or pulled to move relative to the stationary stage (together with the image sensor). In some embodiments, the one or more shape-memory elements may be implemented using one or more shape-memory alloys (SMAs).

In some embodiments, the OIS system may be controlled to move the image sensor relative to the lens group, e.g., in at least one direction approximately parallel to the optical axis of the lens group and/or another direction approximately orthogonal to the optical axis of the lens group. In some embodiments, the OIS system may include a voice coil motor (VCM) actuator having one or more current-conducting coils and one or more magnets, two of which may interact with each other to generate regulatable motive force (e.g., Lorentz force). In some embodiments, the OIS system may include a flexure suspension arrangement having a dynamic platform fixedly coupled with an image sensor package holding the image sensor, a static platform fixedly coupled with a stationary structure of the camera, and one or more flexure arms connecting the dynamic platform to the static platform. The flexure arms may allow for the moving flexibility between the dynamic platform (and the image sensor) and the static platform. Therefore, in some embodiments, the VCM actuator may be controlled to generate the motive force to move the dynamic platform, together with the image sensor, relative to the static platform and thus the lens group (assuming the lens group is stationary with respect to the static platform from the perspective of the image sensor). In some embodiments, the OIS system may include a bearing suspension arrangement having one or more stages coupled via at least one or more sets of bearings. In some embodiments, the image sensor may be attached to at least one of the stages, and the one or more stages collectively may suspend the image sensor from the lens group. The bearings may provide the flexibility allowing the stages (together with the image sensor) to move relative to the lens group. Therefore, in some embodiments, the VCM actuator may be controlled to move the image sensor relative to the lens group, using the bearing suspension arrangement.

FIG. 1 shows an example camera with AF and OIS functions, according to some embodiments. In this example, camera 100 may include folded optics arrangement 105 with an AF system and image sensor 110 with an OIS system. In some embodiments, folded optics arrangement 105 may include one or more light-folding elements (e.g., a first light-folding element 115 and a second light-folding element 120 as shown in this example) and lens group 125 having one or more lens elements. In some embodiments, camera 100 may include a lens carrier (not shown in FIG. 1) which may be fixedly coupled with lens group 125. For example, the lens carrier may include threads inside, and the one or more lens elements of lens group 125 may be screwed into the lens carrier from inside, such that the lens carrier may hold the one or more lens elements. In some embodiments, the one or more lens elements of lens group 125 may define an optical axis (or X-axis) that passes through a geometrical center of the one or more lens elements, as shown in FIG. 1. Note that technically the optical axis may exist in multiple directions, e.g., a first portion incident on the first light-folding element 115 (e.g., along Z-axis), a second portion passing through lens group 125 (e.g., along X-axis), and a third portion between the second light folding element 120 and image sensor 110 (e.g., along Z-axis). For purposes of discussion and defining relevant directions, the term "optical axis" refers only to the portion passing through lens group 125 (e.g., along X-axis) in various embodiments described in this disclosure.

In this example, light-folding elements 115 and 120 may each include a multi-surface prism (e.g., a triangular prism).

In some embodiments, light-folding element 115 may include at least a surface S1, whilst light-folding element 120 may include at least a surface S2. Alternatively, instead of using prisms, light-folding elements 115 and 120 may individually simply include a mirror having a surface, e.g., surfaces S1 and S2. Regardless of using a prism or mirror, the surfaces S1 and S2 may each include a reflective coating, e.g., a thin layer of metal, a film with a white inner surface, and the like. As shown in FIG. 1, in some embodiments, light-folding element 115 may be positioned optically (along the optical transmitting path of light) in front of lens group 125, light-folding element 120 may be positioned optically after lens group 125, and image sensor 110 may be positioned optically after folded optics arrangement 105 (including light-folding element 115, lens group 125, and light-folding element 120), such that the light may be folded or redirected (e.g., by reflection) at surface S1 of light-folding element 115 from a first direction (e.g., along Z-axis) to a second direction (e.g., along X-axis), pass through lens group 125, be folded or redirected (e.g., by reflection) again at surface S2 of light-folding element 120 from the second direction (e.g., along X-axis) to a third direction (e.g., a direction approximately parallel to Z-axis) to focus on the image plane on image sensor 110, as indicated by the edges in FIG. 1. One benefit is that the light-folding actions by folded optics arrangement 105 may effectively increase the optical total track length (TTL) and/or the focal length of camera 100, without having to increase the size of camera 100. Note that FIG. 1 is only provided as an example for purposes of illustration. Depending on the number, size, shape, and/or optical (and spatial) arrangement of its included light-folding elements, folded optics arrangement 105 may fold or redirect the light once, twice, or even more times before and/or after the light passing through lens group 125.

In some embodiments, camera 100 may be able to perform AF and/or OIS functions. For instance, with the AF function, the one or more lens elements of lens group 125 may be controlled to move relative to image sensor 110, e.g., in at least one direction approximately parallel to the optical axis (or X-axis) of lens group 125, as indicated by the edge in FIG. 1. By comparison, with the OIS function, image sensor 110 may be controlled to move relative to lens group 125, e.g., in at least one direction approximately parallel to the optical axis (or X-axis) of lens group 125 and/or another direction (e.g., along Y-axis) approximately orthogonal to the optical axis (or X-axis) of lens group 125, as indicated by the edges in FIG. 1.

Figure 2A:
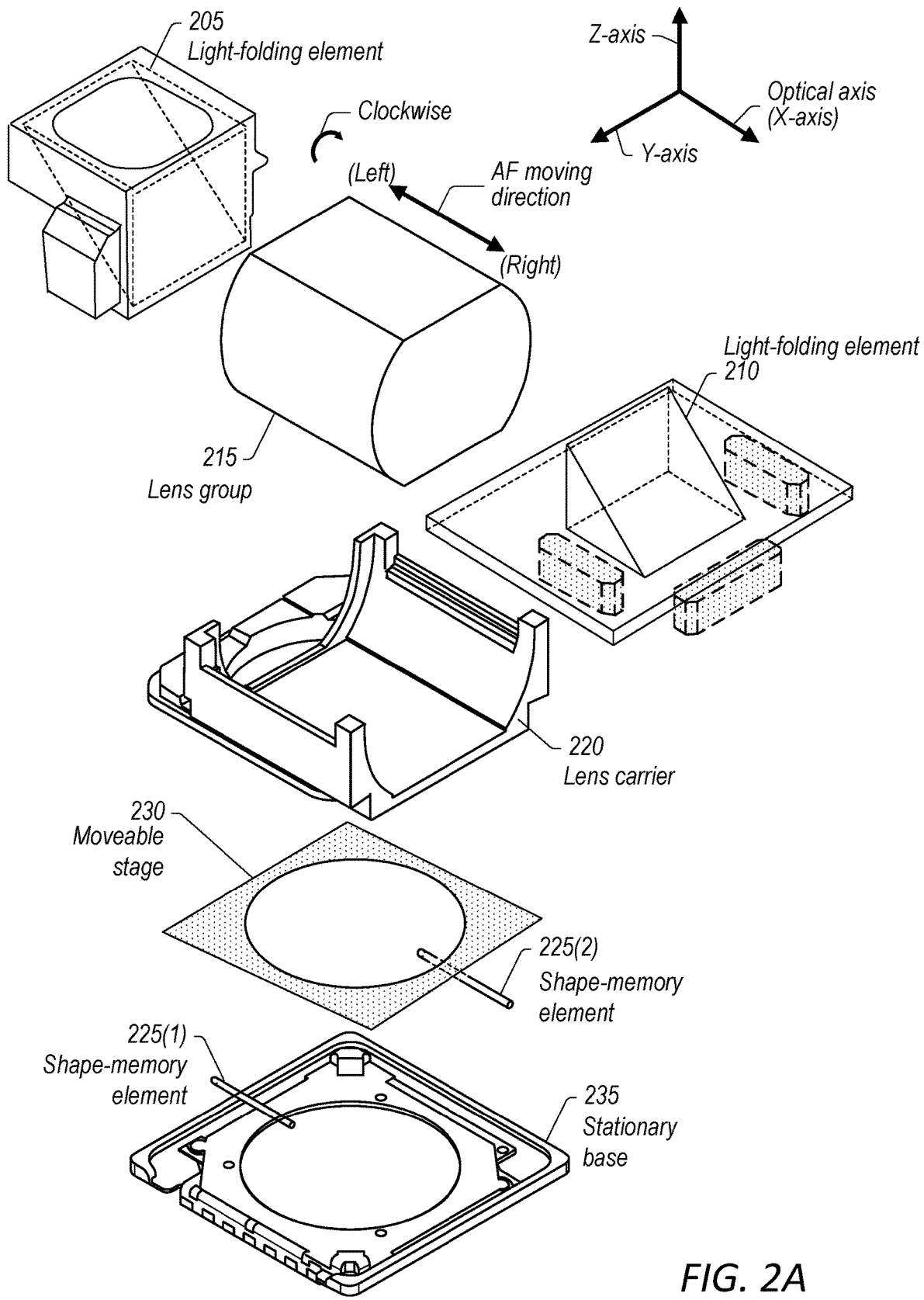
FIG. 2A shows an exploded view of example AF shape-memory actuator and a folded optics arrangement of a camera, according to some embodiments.
Figure 2B:
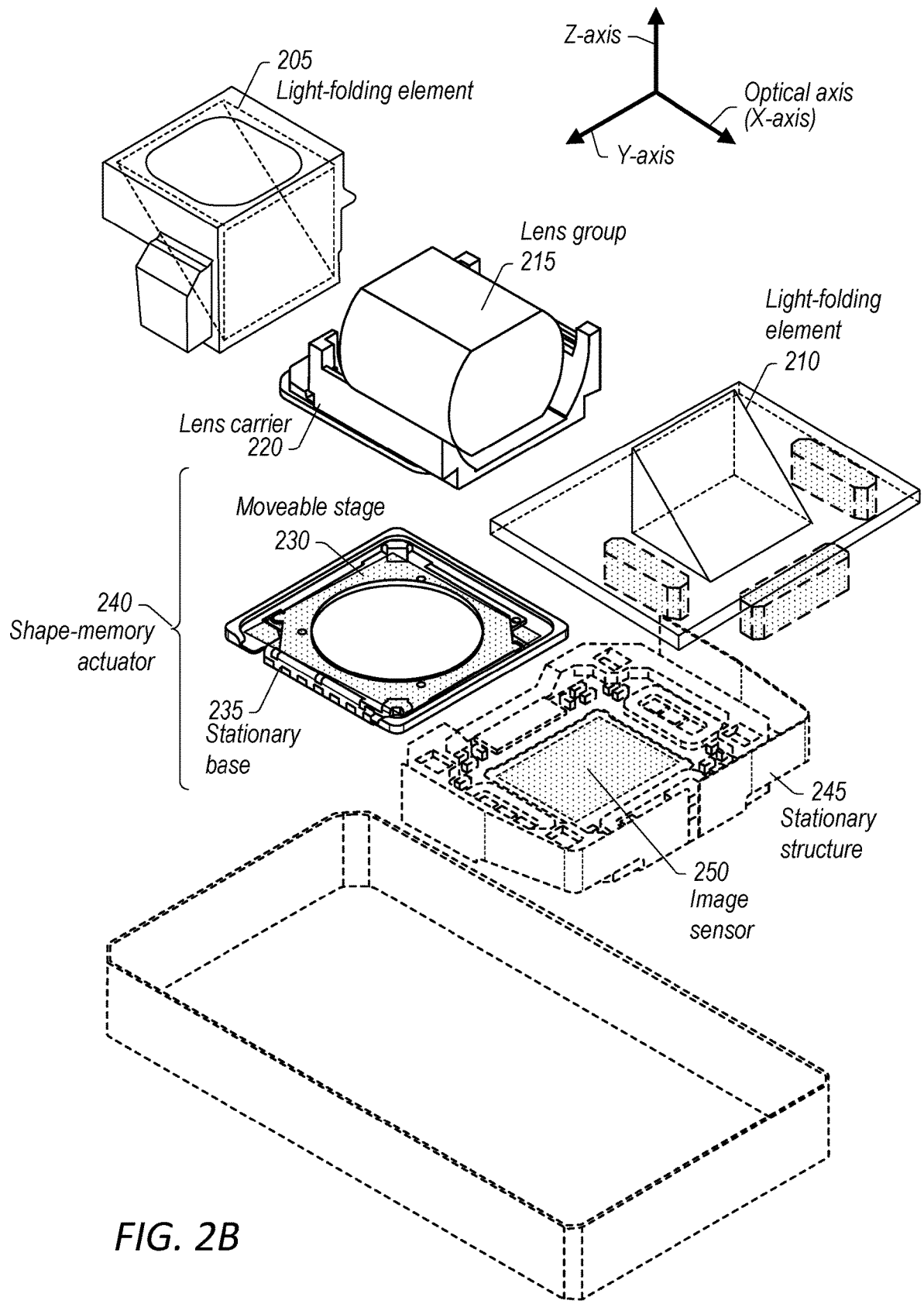
FIG. 2B shows a collapsed view of example AF shape-memory actuator and a folded optics arrangement of a camera, according to some embodiments.

In some embodiments, the AF function may be implemented using an AF system of camera 100 (as shown in FIGS. 2A-2B). In some embodiments, the AF system may include a shape-memory actuator having one or more shape-memory elements whose lengths and/or shapes may be controlled by regulating the individual temperatures of those shape-memory elements under a temperature-induced shape-memory effect. For instance, the shape-memory elements may include one or more one-way shape-memory elements, one or more two-way shape-memory elements, or a combination of both one-way and two-way shape-memory elements. A one-way shape-memory element may be deformed (e.g., stretched to a relatively longer length) at a relatively low temperature and return to its pre-deformed ("remembered") shape (e.g., shrank to a relatively shorter length) when heated to a relatively high temperature. By comparison, a two-way shape-memory element may remember two different lengths and/or shapes, one at a relative low temperature and the other at a relatively high temperature. By regulating its temperature, the two-way shape-memory element may be controlled to transition between the two "remembered" lengths. In some embodiments, the shape-memory elements may be implemented using various shape-memory alloys (SMAs), e.g., nickel-titanium alloy (Ni—Ti), nickel-titanium-hafnium alloy (Ni—Ti—Hf), silver-cadmium alloy (Ag—Cd), and the like, Different SMAs may be used to provide various specific performances, e.g., response time and/or response symmetry, for the shape-memory actuator of camera 100. In some embodiments, camera 100 may include one or more heating elements which may be used to control the individual temperatures of the one or more shape-memory elements. For instance, in some embodiments, the heating elements may include one or more power supplies which may drive regulated current flowing through individual shape-memory elements to directly heat the shape-memory elements. Additionally, or alternatively, in some embodiments, the heating elements may include one or more electric heaters separate from and arranged proximate the shape-memory elements, through which the individual temperatures of the shape-memory elements may be adjusted.

In some embodiments, the shape-memory actuator may include a moveable stage and a stationary base. In some embodiments, the moveable stage and/or the stationary base may be arranged approximately on a plane (e.g., X-Y plane) parallel to the optical axis (or X-axis) of lens group 125. In some embodiments, the moveable stage may be fixedly coupled with the lens group, whilst the stationary base may be indirectly, fixedly coupled with the image sensor. In some embodiments, the moveable stage (together with the lens group) may be flexibly coupled with the stationary base (together with the image sensor) via at least the one or more shape-memory elements of the shape-memory actuator. For instance, the shape-memory elements may include one or more shape-memory wires (e.g., SMA wires) individually attached to the moveable stage and stationary base. When the temperatures of the shape-memory wires change, the lengths and/or shapes of the individual shape-memory elements may vary accordingly. For instance, by regulating the temperatures, the lengths of the shape-memory wires may become longer (or shorter). Accordingly, the moveable stage (together with lens group 125) may be pushed to one direction (or pulled to another direction) by the stretched (or shrank) shape-memory wires. As a result, the moveable stage (together with lens group 125) may move relative to the stationary stage (together with image sensor 110), e.g., at least in a direction approximately parallel to the optical axis (or X-axis) of lens group 125, as indicated by the edge in FIG. 1. In some embodiments, the shape-memory actuator may also rotate lens group 125 relative to image sensor 110, e.g., to an angle along Z-axis with respect to image sensor 110. For instance, the shape-memory actuator may tilt up a first portion and tilt down a second portion of lens group 125 approximately along Z-axis such that lens group rotates clockwise to an angle relative to image sensor 110.

Figure 3:
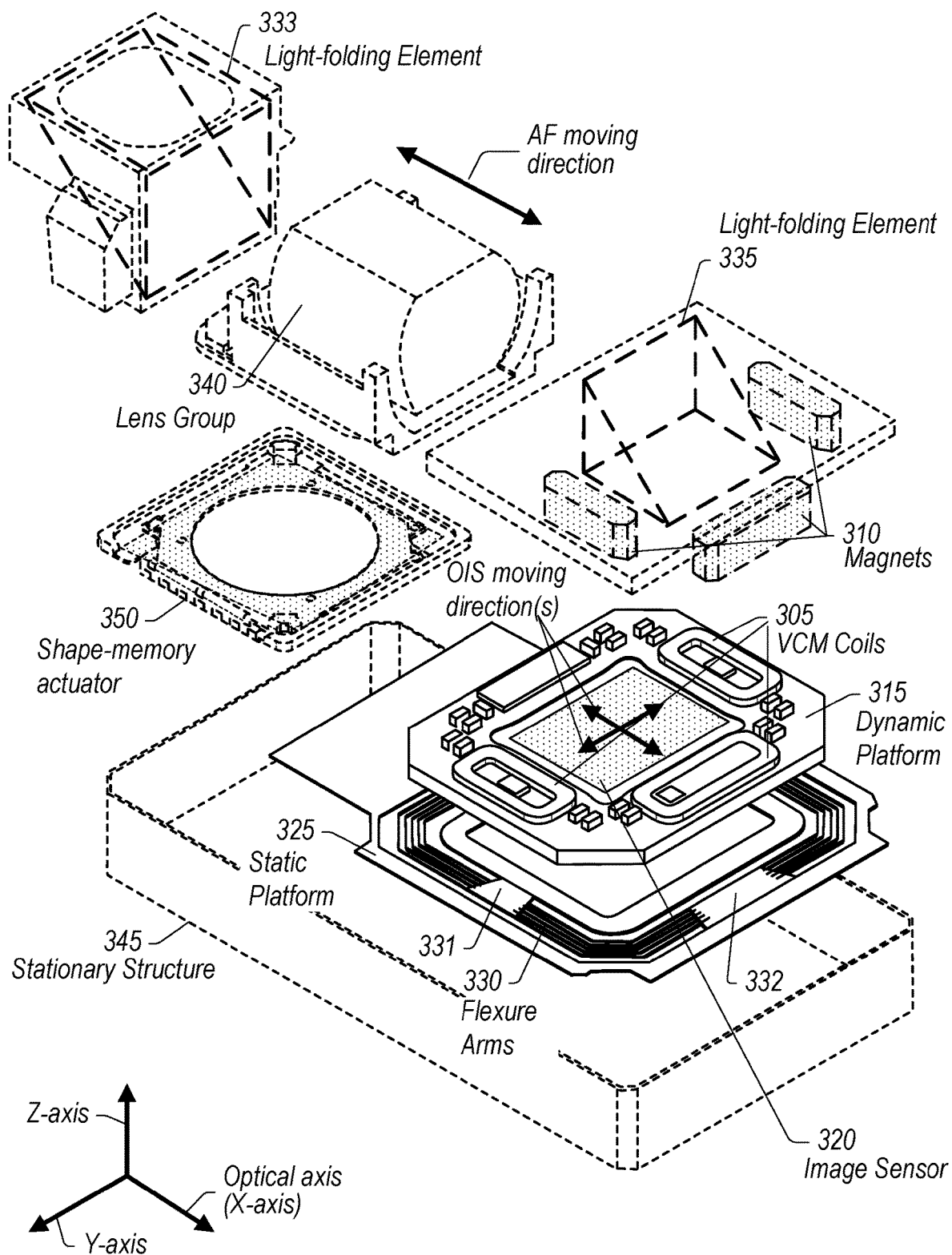
FIG. 3 shows an exploded view of example OIS actuator and image sensor of a camera, according to some embodiments.
Figure 4:
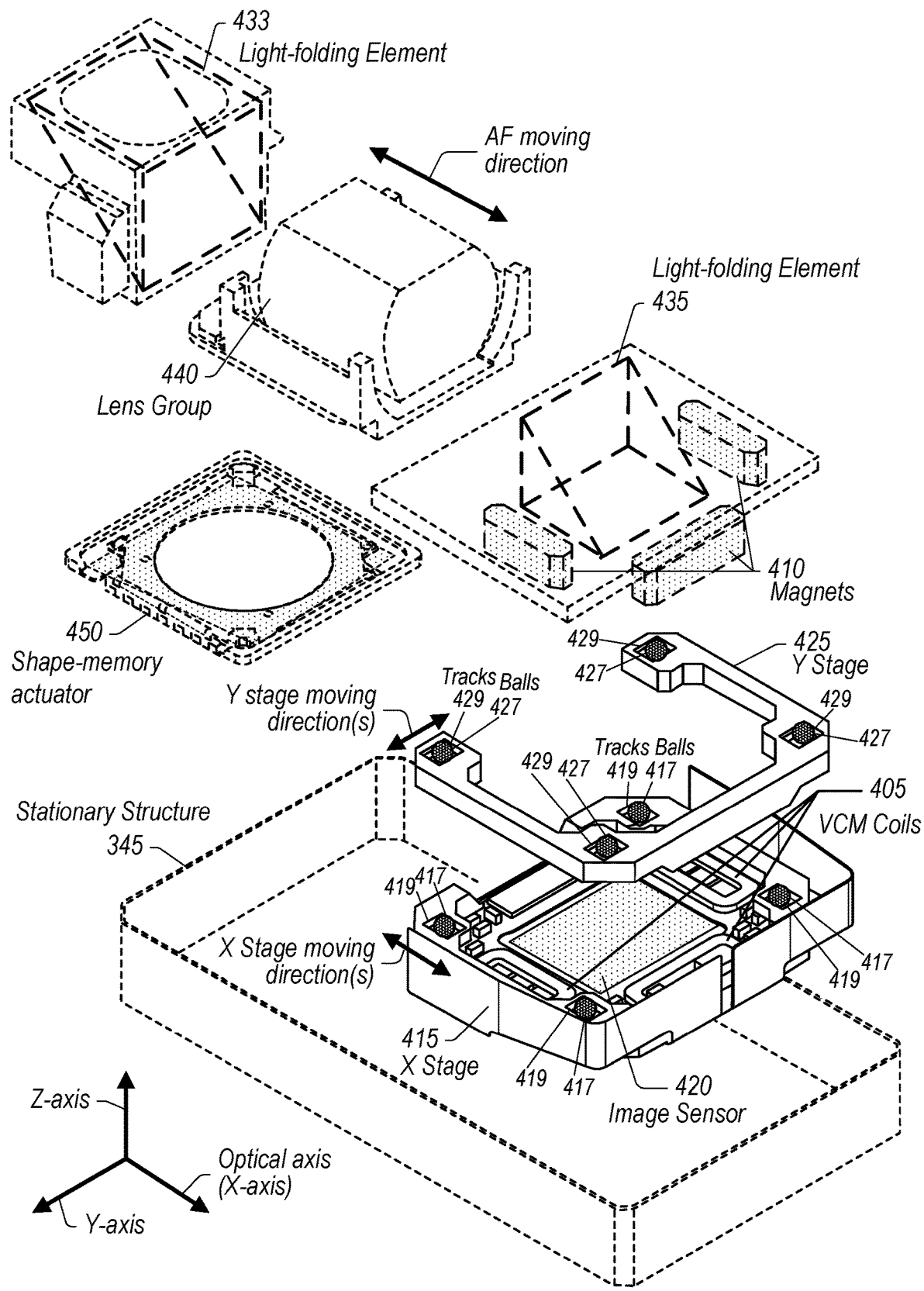
FIG. 4 shows an exploded view of other example OIS actuator and image sensor of a camera, according to some embodiments.

Referring back to FIG. 1, in some embodiments, the OIS function of camera 100 may be implemented using an OIS system (as shown in FIGS. 3-4). In some embodiments, the OIS system may include a voice coil motor (VCM) actuator having one or more current-conducting coils and one or more magnets. In some embodiments, the magnets may individually generate magnetic fields, which may interact with the current flowing through the coils to generate motive force (e.g., Lorentz force). Given the magnetic fields, by regulating the current, the motive force may be controlled in amplitude and/or direction. In some embodiments, the OIS system may include a flexure suspension arrangement having a dynamic platform fixedly coupled with an image sensor package holding image sensor 110 (e.g., image sensor 110 may be attached to the image sensor package through soldering), a static platform fixedly coupled with a stationary structure of camera 100, and one or more flexure arms connecting the dynamic platform to the static platform. The flexure arms may allow the dynamic platform (and image sensor 110) to move relative to the static platform, e.g., in one direction approximately parallel to the optical axis (or X-axis) and/or another direction (Y-axis) approximately orthogonal to the optical axis (or X-axis), as indicated by the edges in FIG. 1. Therefore, in some embodiments, the VCM actuator may be controlled to regulate the motive force to move the dynamic platform (together with image sensor 110) relative to lens group 125 along X-axis and/or Y-axis. In some embodiments, the OSI system may include a bearing suspension arrangement having one or more stages coupled together via at least one or more sets of bearings. In some embodiments, image sensor 110 may be attached to at least one of the stages, and the one or more stages collectively may suspend image sensor 110 from folded optics arrangement 105 (and thus lens group 125) of camera 100. Therefore, in some embodiments, the VCM actuator may be controlled to move the stages (together with image sensor 110) relative to lens group 125 of camera 100, given the moving flexibility provided by the bearing suspension arrangement.

FIG. 2A shows an exploded view of example AF shape-memory actuator and a folded optics arrangement of a camera, according to some embodiments. In this example, the optical folding arrangement may include light-folding element 205, lens group 215, light-folding element 210, and lens carrier 220, whilst the shape memory actuator may include one or more shape-memory elements 225, moveable stage 230, and stationary base 235. In some embodiments, lens group 215 may include one or more lens elements. In some embodiments, the one or more lens elements of lens group 215 may be attached to lens carrier 220. In some embodiments, the one or more lens elements of lens group 215 may define an optical axis (or X-axis), as shown in FIG. 2. In some embodiments, light-folding element 205 may be positioned optically (along the optical transmitting path of light) in front of lens group 215, light-folding element 210 may be positioned optically after lens group 215, such that light may first enter light-folding element 205 from a first direction (e.g., along Z-axis), be folded or redirected by light-folding element 205 to a second direction (e.g., along X-axis) to lens group 215, pass through the one or more lens elements of lens group 215 to light-folding element 210, and be folded or redirected one more time by light-folding element 210 to a third direction (e.g., a direction parallel to Z-axis) to an image sensor. As described above, light-folding elements 205 and/or 210 may individually include a prism (e.g., a triangular prism and the like) or a mirror having at least one reflective surface, and the light may be folded or redirected by reflection at respective reflective surfaces of light-folding elements 205 and 210.

In some embodiments, the shape-memory actuator may move the one or more lens elements of lens group 215 relative to the image sensor in at least a direction parallel to the optical axis (or X-axis) of lens group 215, as indicated by the edge in FIG. 2A. For instance, in some embodiments, lens carrier 220 (and lens group 215) may be fixedly coupled with moving stage 230, whilst stationary stage 235 may be indirectly, fixedly coupled with the image sensor. In some embodiments, moving stage 230 may be flexibly coupled with stationary stage 235 via at least shape-memory elements 225. In this example, moving stage 230 may be positioned on top of stationary stage 235, and shape-memory elements 225 may be placed vertically in-between to couple moving stage 230 with stationary stage 235. In another example, moving stage 230 may be positioned inside (or outside of) stationary stage 235, and shape-memory elements 225 may be placed horizontally in-between to couple moving stage 230 with stationary stage 235. As shown in FIG. 2A, shape-memory elements 225 may include two shape-memory wires 225(1) and 225(2), each of which may be implemented using one or more shape-memory alloys. In some embodiments, shape-memory wire 225(1) and 225(2) may individually extend along a direction approximately parallel to the optical axis (or X-axis) of lens group 215, such that for each shape-memory wire 225(1) and 225(2), a respective first portion may attach to stationary stage 235 whilst a respective second portion may attach to moving stage 230.

As described above, the shape-memory actuator may further include one or more heating elements (not shown in FIG. 2A) which may be used to control the individual temperatures for shape-memory wires 225(1) and 225(2). With the temperature variation, the lengths and/or shapes of shape-memory wires 225(1) and 225(2) may change under the temperature-induced shape-memory effect. For instance, in some embodiments, shape-memory wire 225(1) may be heated to shrink to a relative shorter length, whilst shape-memory wire 225(2) may be cooled down to stretch to a relatively longer length, such that moving stage 230 (together with lens carrier 220 and lens group 215) may be pushed relative to stationary stage 235 (and the image sensor) in the negative (or left) direction approximately parallel to the optical axis (or X-axis) of lens group 215. Alternatively, in some embodiments, shape-memory wire 225(1) may be controlled to stretch to a relatively longer length, whilst shape-memory wire 225(2) may shrink to a relatively shorter length, such that moving stage 230 (together with lens carrier 220 and lens group 215) may be pulled relative to stationary stage 235 (and the image sensor) in an opposite positive (or right) direction along the optical axis (or X-axis) of lens group 215. In short, by controlling individual temperatures for shape-memory elements 225, the shape-memory actuator may push-pull or move lens group 215 relative to the image sensor, e.g., in at least one direction approximately parallel to the optical axis (or X-axis) of lens group 215, to perform various AF functions, as indicated by the edge in FIG. 2A. Compared to conventional electromechanical AF actuators (e.g., VCM AF actuators), the memory-shape actuator disclosed herein may allow the camera to achieve at least a reduced height along Z-axis (e.g., the Z-height) because the memory-shape actuator may eliminate at least the coil(s) arranged around (e.g., wound around) the perimeter of the lens elements of lens group 215 in the conventional electromechanical AF actuators. In addition, unlike conventional electromechanical AF actuators, the memory-shape actuator may not necessarily require magnet(s). Therefore, the memory-shape AF actuator may not be subject to magnetic interference with magnet(s) of another module or component (e.g., the OIS system) inside the camera. This may allow for reduced module-to-module spacing and thus a further optimal packaging for the camera.

Note that FIG. 2A shows two shape-memory wires 225(1) and 225(2) only as an example for purposes of illustration. In some embodiments, the shape-memory actuator may not necessarily use wires to implement shape-memory elements.

Instead, the shape-memory elements may be in various sizes and/or shapes, e.g., one shape-memory element in a relatively thinner wire whilst another shape-memory element in a relatively wider wire, or one shape-memory element in a wire whilst another shape-memory element in a triangular stripe. In some embodiments, the shape-memory actuator may have less or more than two shape-memory elements. For instance, the shape-memory actuator may include an odd or even number of shape-memory elements, and the shape-memory elements may connect moving stage 230 to stationary base 235 in a geometrically asymmetric or symmetric arrangement. In some embodiments, shape-memory elements of the shape-memory actuator may not necessarily align with each other along a same line. Instead, the shape-memory elements may be mismatched but still parallel to each other. Alternatively, the shape-memory elements may extend in different directions to form a non-zero angle between each other.

In some embodiments, the shape-memory actuator may rotate moving stage 230 (together with lens group 215) relative to stationary stage 235 (and the image sensor), e.g., tilting moving stage 230 to an angle along Z-axis with respective to stationary stage 235. For instance, when moving stage 230 is pushed in the negative (or left) direction parallel to the optical axis (or X-axis) of lens group 215, the shape-memory actuator may tilt up a first (or left) portion and tilt down a second (or right) portion of lens group 125, such that lens group may rotate clockwise to an angle relative to image sensor 110. Conversely, when pulling moving stage 230 in the positive (or right) direction parallel to the optical axis (or X-axis) of lens group 215, the shape-memory actuator may tilt down the first (or left) portion and tilt up the second (or right) portion of lens group 125 such that lens group rotates counter-clockwise to an angle relative to image sensor 110. In some embodiments, the rotation of lens group 125 relative to the image sensor may be used to provide active damping for image capture.

FIG. 2B shows a collapsed view of example AF shape-memory actuator and a folded optics arrangement of a camera, according to some embodiments. As shown in FIG. 2B, after assembly, lens group 215 may be fixed coupled with lens carrier 220, whilst shape-memory elements 225 (not visible in FIG. 2B), moveable stage 230, and stationary base 235 may together form shape-memory actuator 240. In some embodiments, stationary base 235 may be fixedly coupled to stationary structure 245, which may further be fixedly coupled with image sensor 250.

FIG. 3 shows an exploded view of example OIS actuator and image sensor of a camera, according to some embodiments. In some embodiments, the camera may have flexure suspension arrangement including dynamic platform 315, static platform 325, and one or more flexure arms 330. In this example, the OIS actuator may include a VCM actuator having one or more current-conducting coils 305 and one or more magnets 310. In some embodiments, coils 305 may be attached to dynamic platform 315, whilst magnets 310 may be housed in one or more magnet carriers attached to a structure holding light-folding element 335 (e.g., similar to light-folding element 210 in FIGS. 2A-2B) of a folded optics arrangement of the camera. In some embodiments, image sensor 320 of the camera may be fixedly coupled with dynamic platform 315, e.g., image sensor 320 may be mounted to an image sensor package (e.g., an image sensor socket) which may be further soldered to dynamic platform 315. In some embodiments, static platform 235 may be fixedly coupled with stationary structure 345 of the camera. In some embodiments, dynamic platform 315 may be flexibly coupled with static platform 325 through one or more flexure arms 330 which may, e.g., surround the perimeter of dynamic platform 315 in-between dynamic platform 315 and static platform 325. For instance, flexure arms 330 may individually connect to dynamic platform 315 via pad 331 (which is part of dynamic platform 315) and static platform 325 via pad 332 (which is part of static platform 325). As shown in FIG. 3, flexure arms 330 may provide moving flexibility to allow dynamic platform 315 (together with image sensor 320) to move relative to static platform 325 in at least a direction approximately parallel to the optical axis (or X-axis) of lens group 340 and/or another direction (along y-axis) approximately orthogonal to the optical axis (or X-axis) of lens group 340, as indicated by the edges in FIG. 3. In some embodiments, magnets 310 may individually generate magnetic fields, whilst coils 305 may individually conduct current. In some embodiments, coils 305 may be placed proximate magnets 310, such that the current of individual coils 305 may interact with the magnetic fields of magnets 310 to generate motive force (e.g., Lorentz force) to move dynamic platform 315 (together with image sensor 320) relative to move static platform 325 (together with stationary structure 345). Assuming lens group 340 is stationary with respect to stationary structure 345 from the perspective of image sensor 320, the VCM actuator of the camera may thus move image sensor 320 relative to lens group 340, e.g., at least approximately on the X-Y plane along X-axis and/or Y-axis, to perform various OSI functions, as indicated by the edges in FIG. 3.

FIG. 4 shows an exploded view of other example OIS actuator and image sensor of a camera, according to some embodiments. In some embodiments, the camera may include a bearing suspension arrangement having one or more stages, e.g., X stage 415 and Y stage 425 in the example shown in FIG. 4. In some embodiments, X stage 415 and Y stage 425 may be flexibly coupled together via at least one or more sets of bearings. In this example, X stage 415 may be arranged underneath and flexibly coupled with Y stage 425 through a first set of bearing having balls 417. In some embodiments, balls 417 may individually roll within a respective track 419 on X stage 415. Note that for purposes of illustration, FIG. 4 does not show the corresponding tracks on Y track 425 facing X stage 415. In other words, when X stage 415 and Y stage 425 are assembled together, balls 417 may be "sandwiched" between X stage 415 and Y stage 425 and may be restricted to roll within tracks 419 on X stage 415 and the corresponding tracks on Y stage 425. Similarly, in some embodiments, Y stage 425 may be arranged underneath and flexibly coupled the stationary base (e.g., stationary base 235 in FIGS. 2A-2B) of shape memory actuator 450 through a second set of bearing having balls 427. In addition, there may be tracks underneath shape memory actuator 450 corresponding to tracks 429 on Y stage 425 (not shown in FIG. 4). Accordingly, when Y stage 425 and shape memory actuator 450 are assembled together, balls 427 may be restricted to roll within tracks 429 on Y stage 425 and the corresponding tracks on shape memory actuator 450.

In some embodiments, image sensor 420 of the camera may be mounted to at least one of the stages of the bearing suspension arrangement, e.g., X stage 415 in this example. Therefore, the one or more stages (e.g., X stage 415 and Y stage 425) of the bearing suspension arrangement collectively may suspend image sensor 420 from the folded optics arrangement (and thus lens group 440) of the camera. The bearing suspension arrangement may provide moving flexibility for X stage 415 (and image sensor 420) and Y stage 425. In addition, the degrees of moving freedoms may be "controlled" by the tracks, e.g., tracks 419, tracks 429, and/or their corresponding tracks. For instance, tracks 419 on X stage 415 (and the corresponding tracks on Y stage 425) may extend in a direction approximately parallel to the optical axis (or X-axis) of lens group 440, such that balls 417 may roll only along X-axis, as indicated by the edge in FIG. 4. Similarly, in another example, tracks 429 on Y stage 425 (and the corresponding tracks on shape-memory actuator 450) may extend in a direction (e.g., along Y-axis) approximately orthogonal to the optical axis (or X-axis) of lens group 440, such that balls 427 may roll only along Y-axis, as indicated by the edge in FIG. 4. Therefore, given these degrees of freedom, X stage 415 (and image sensor 420) may move freely along X-axis relative to Y stage 425—thus moving image sensor 420 relative to light-folding element 435 (and thus lens group 440) along X-axis. Similarly, Y stage 425 may move freely along Y-axis relative to light-folding element 435 (and thus lens group 440). However, when Y stage 425 moves along Y-axis, Y stage 425 may also drag X stage 415 (and image sensor 420) to move together with Y stage 425 due to the degrees of freedom restrictions of balls 417 in Y-axis—thus moving image sensor 420 relative to lens group 440 along Y-axis.

In some embodiments, the motive force to move X stage 415 and/or Y stage 425 may be generated using an OIS actuator. In some embodiments, the OIS actuator may include a VCM actuator having one or more current-conducting coils 405 and one or more magnets 410. In some embodiments, coils 405 may be attached to at least one stage (e.g., X stage 415) of the bearing suspension arrangement, whilst magnets 410 may be housed in one or more magnet carriers attached to a structure holding light-folding element 435 (e.g., similar to light-folding element 210 in FIGS. 2A-2B) of a folded optics arrangement of the camera. In some embodiments, the VCM actuator may regulate the current flowing through coils 405 to generate and control motive force (e.g., Lorentz force) to move (as described above) image sensor 420 relative to lens group 440, e.g., at least in a direction approximately parallel to the optical axis (or X-axis) of lens group 440 and/or another direction (e.g., along Y-axis) approximately orthogonal to the optical axis (or X-axis) of lens group 440.

Figure 5:
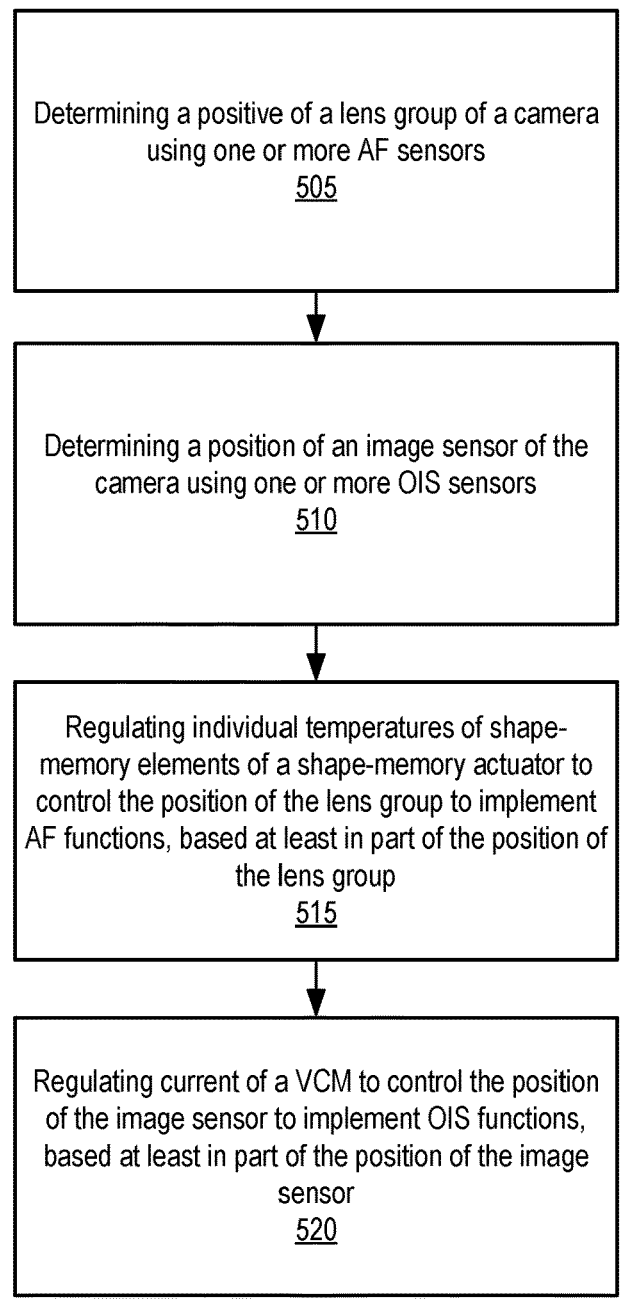
FIG. 5 shows an example high-level flowchart of a method for performing AF and/or OIS functions of a camera, according to some embodiments.

FIG. 5 shows an example high-level flowchart of a method for performing AF and/or OIS functions of a camera, according to some embodiments. As shown in FIG. 5, in some embodiments, the method may include determining a position of a lens group (e.g., the lens group described above in FIGS. 1-4) of a camera (e.g., the folded camera described above in FIGS. 1-4) using one or more AF sensors, as indicated in block 505. In some embodiments, the method may include determining a position of an image sensor (e.g., the image sensor described above in FIGS. 1-4) of the camera using one or more OIS sensors, as indicated in block 510. In some embodiments, the method may include regulating individual temperatures of shape-memory elements of a shape-memory actuator (e.g., the shape-memory actuator described above in FIGS. 1-2) to control the position of the lens group to implement various AF functions, based at least in part on the position of the lens group, as indicated in block 515. For instance, as described above, the shape-memory elements may be heated (or cooled) to become shorter (or longer) to push (or pull) the lens group relative to the image sensor, e.g., at least in a direction approximately parallel to the optical axis (or X-axis) of the lens group. In some embodiments, the method may include regulating current of a VCM actuator (e.g., the VCM actuator in FIGS. 1 and 3-4) to control the position of the image sensor to implement various OIS functions, based at least in part on the position of the image sensor, as indicated in block 520. For instance, as described above, the VCM actuator may include one or more current-conducting coils and one or more magnets. In addition, in some embodiments, the camera may include a flexure suspension arrangement (e.g., the flexure suspension arrangement in FIG. 3) or a bearing suspension arrangement (e.g., the bearing suspension arrangement in FIG. 4). In some embodiments, the VCM actuator may control the image sensor to move relative to the lens group, e.g., at least in a direction approximately parallel to the optical axis (or X-axis) of the lens group and/or another direction (e.g., along Y-axis) approximately orthogonal to the optical axis (or X-axis) of the lens group.

Figure 6:
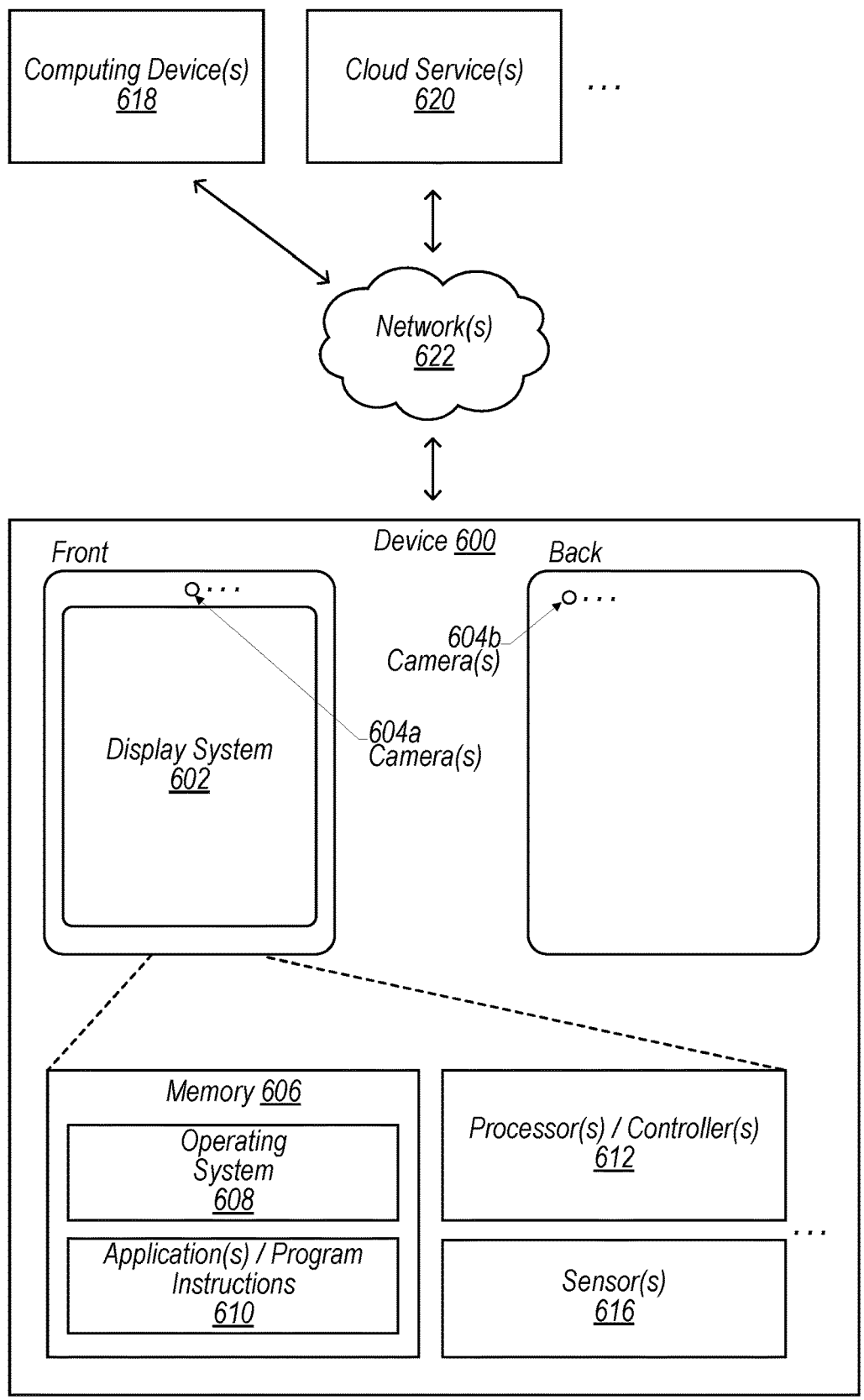
FIG. 6 shows a schematic representation of an example device that may include a camera having AF shape-memory actuator and OIS voice coil motor (VCM) actuator, according to some embodiments.

FIG. 6 illustrates a schematic representation of an example device 600 that may include a camera having AF shape-memory actuator and OIS VCM actuator, e.g., as described herein with reference to FIGS. 1-5, according to some embodiments. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 6. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 616 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 710) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
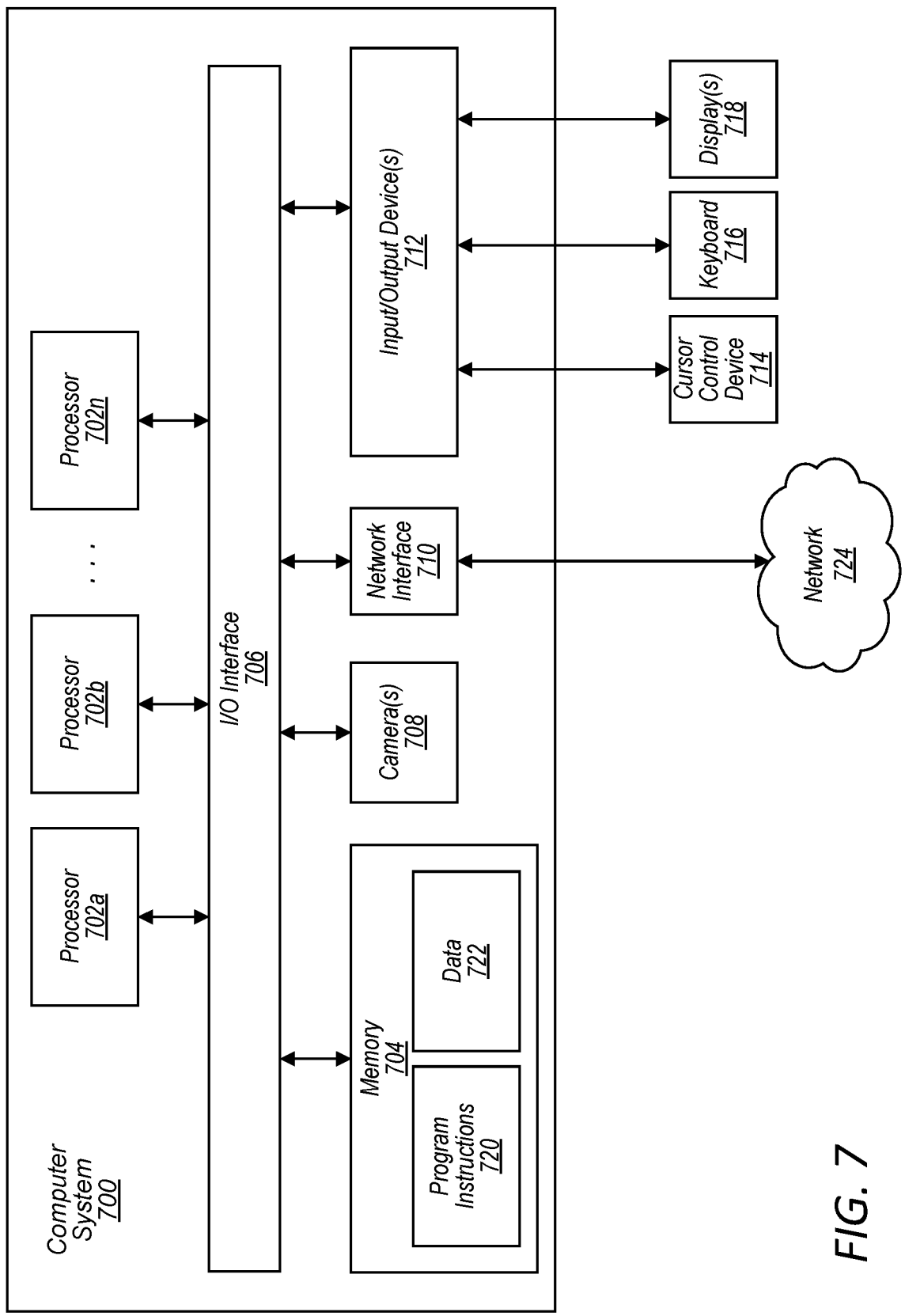
FIG. 7 shows a schematic block diagram of an example computer system that may include a camera having AF shape-memory actuator and OIS VCM actuator, according to some embodiments.

FIG. 7 illustrates a schematic block diagram of an example computing device, referred to as computer system 700, that may include or host embodiments of a camera having AF shape-memory actuator and OIS VCM actuator, e.g., as described herein with reference to FIGS. 1-6, according to some embodiments. In addition, computer system 700 may implement methods for controlling operations of the camera and/or for performing image processing images captured with the camera. In some embodiments, the device 600 (described herein with reference to FIG. 6) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a folded optics arrangement to fold a path of light, the folded optics arrangement comprising:
      a light-folding element; and
      a lens group comprising one or more lens elements that define an optical axis;
   an image sensor to capture image data based on light that passes through the light-folding element and the lens group, wherein the image sensor is movable relative to at least a portion of the folded optics arrangement; and
   a shape-memory actuator comprising at least one shape-memory element extending along at least one direction parallel to the optical axis of the lens group, wherein the shape-memory actuator is configured to move the lens group, relative to the image sensor and in the at least one direction parallel to the optical axis, based at least in part on a shape-memory effect of the shape-memory element.

2. The camera of claim 1, wherein the shape-memory element comprises a wire having a temperature-induced shape-memory effect that causes the wire to change in length in the at least one direction parallel to the optical axis.

3. The camera of claim 1, wherein the shape-memory actuator comprises a plurality of shape-memory alloy (SMA) wires, and wherein the shape-memory element is a SMA wire included in the plurality of SMA wires.

4. The camera of claim 3, wherein the shape-memory actuator further comprises:
   a stationary base; and
   a movable stage coupled with the lens group, such that the lens group is movable, together with the movable stage, relative to the stationary base;
   wherein respective wires of the plurality of SMA wires comprise:
      a respective first portion attached to the stationary base; and
      a respective second portion attached to the movable stage.

5. The camera of claim 4, further comprising:
   a lens carrier fixedly coupled with the lens group;
   wherein the movable stage is attached to the lens carrier.

6. The camera of claim 4, wherein the shape-memory actuator further comprises:
   one or more heating elements that are individually controllable to heat at least a portion of the plurality of SMA wires.

7. The camera of claim 1, further comprising:
   a voice coil motor (VCM) actuator to move the image sensor in one or more directions along a plane that is parallel to the optical axis.

8. A device, comprising:
   one or more processors;
   memory storing program instructions executable by the one or more processors to control operations of a camera; and
   the camera, comprising:
      a folded optics arrangement to fold a path of light, the folded optics arrangement comprising:
         one or more light-folding elements; and
         a lens group comprising one or more lens elements that define an optical axis;
      an image sensor to capture image data based on light that passes through the one or more light-folding elements and the lens group, wherein the image sensor is movable relative to at least a portion of the folded optics arrangement; and
      a shape-memory actuator comprising at least one shape-memory element extending along at least one direction parallel to the optical axis, wherein the shape-memory actuator is configured to move the lens group, relative to the image sensor and in the at least one direction parallel to the optical axis, based at least in part on a shape-memory effect of the shape-memory element.

9. The device of claim 8, wherein the shape-memory actuator comprises a plurality of shape-memory alloy (SMA) wires, and wherein the shape-memory element is a SMA wire included in the plurality of SMA wires.

10. The device of claim 9, wherein the shape-memory actuator further comprises:
   a stationary base; and
   a movable stage coupled with the lens group, such that the lens group is movable, together with the movable stage, relative to the stationary base;
   wherein respective wires of the plurality of SMA wires comprise:
      a respective first portion attached to the stationary base; and
      a respective second portion attached to the movable stage.

11. The device of claim 10, further comprising:
   a lens carrier fixedly coupled with the lens group;
   wherein the movable stage is attached to the lens carrier.

12. The device of claim 10, wherein the plurality of SMA wires comprises:
   a first SMA wire extending along a first axis parallel to the optical axis; and
   a second SMA wire extending along a second axis parallel to the optical axis, wherein the second SMA wire is positioned opposite the first SMA wire with respect to the lens group.

13. The device of claim 10, wherein the program instructions are executable by the one or more processors to:
   control heating of at least a portion of the plurality of SMA wires, such that the shape-memory actuator moves the lens group to one or more target focus positions, wherein, to control the heating, the one or more processors control at least one of:
      one or more heating elements disposed proximate the portion of the plurality of SMA wires; or
      one or more drive currents supplied to the portion of the plurality of SMA wires, wherein the one or more drive currents are to pass through one or more SMA wires of the plurality of SMA wires.

14. The device of claim 8, wherein:
   the shape-memory actuator is configured to move the lens group in the at least one direction parallel to the optical axis, to provide autofocus (AF) movement of an image on the image sensor; and
   the camera further comprises:
      a voice coil motor (VCM) actuator configured to move the image sensor in directions parallel to an image plane of the image sensor, to provide optical image stabilization (OIS) of the image on the image sensor.

15. The device of claim 14, wherein the camera further comprises:
   a flexure suspension arrangement that suspends the image sensor from a stationary structure of the camera and that allows the image sensor to move according to motion enabled by the VCM actuator, wherein the flexure suspension arrangement comprises:
      a dynamic platform fixedly coupled with an image sensor package that includes the image sensor;
      a static platform fixedly coupled with the stationary structure; and
      one or more flexure arms that connect the dynamic platform to the static platform.

16. The device of claim 14, wherein the camera further comprises:
   a bearing suspension arrangement comprising stages configured to move on ball bearings, such that the stages collectively suspend the image sensor from a stationary structure and that allows the image sensor to move according to motion enabled by the VCM actuator.

17. The device of claim 14, wherein:
   the one or more light-folding elements comprise:
      a first prism comprising an object side at which light enters the first prism; and
      a second prism comprising an image side, wherein the light exits the image side towards the image sensor;
      the lens group is positioned, along the optical axis, between first prism and the second prism; and
   the VCM actuator comprises:
      stationary magnets fixedly coupled with a prism carrier to which the second prism is attached; and
      movable coils fixedly coupled with an image sensor package that includes the image sensor, wherein the movable coils are positioned proximate the stationary magnet such that the movable coils are capable of electromagnetically interacting with the stationary magnets to generate Lorentz forces that move the image sensor together with the movable coils.

18. A method, comprising:
moving, via a shape-memory actuator, a lens group of a folded optics system in at least one direction parallel to an optical axis of the folded optics system, wherein the lens group comprises one or more lens elements extending along the at least one direction parallel to the optical axis, wherein the folded optics system comprises the one or more light-folding elements to fold a path of light, and wherein the moving comprises:
   moving, based at least in part on a shape-memory effect of at least one of the shape-memory elements of the shape-memory actuator, a movable stage of the shape-memory actuator, relative to an image sensor, wherein the movable stage is coupled with the lens group such that the lens group moves together with the movable stage.

19. The method of claim 18, wherein:
   the shape-memory actuator comprises a plurality of shape-memory alloy (SMA) wires;
   the shape-memory element is a SMA wire included in the plurality of SMA wires;
   the plurality of SMA wires are attached to the movable stage and to a stationary base of the shape-memory actuator; and
   the method further comprises:
      heating at least a portion of the plurality of SMA wires, so as to induce the shape-memory effect;
      wherein the moving the lens group occurs in response to the heating.

20. The method of claim 19, further comprising:
determining, based at least in part on position data from one or more position sensors, a current position of the lens group;
determining one or more temperatures to which the portion of the plurality of SMA wires is to be heated for the heating to cause movement of the lens group from the current position to a target focus position;

wherein the heating comprises heating the portion of the SMA wires in accordance with the one or more temperatures; and wherein the moving comprises moving the lens group from the current position to the target focus position.

\* \* \* \* \*